(12) United States Patent
Heersink

(10) Patent No.: US 9,022,330 B2
(45) Date of Patent: May 5, 2015

(54) OVERHEAD MOUNTING BRACKET FOR TABBED ACCESSORIES

(76) Inventor: Roland Edward Heersink, Houston, TX (US)

( * ) Notice: Subject to any disclaimer, the term of this patent is extended or adjusted under 35 U.S.C. 154(b) by 0 days.

(21) Appl. No.: 13/336,237

(22) Filed: Dec. 23, 2011

(65) Prior Publication Data

US 2012/0168579 A1 Jul. 5, 2012

Related U.S. Application Data

(60) Provisional application No. 61/460,542, filed on Jan. 4, 2011, provisional application No. 61/628,136, filed on Oct. 25, 2011.

(51) Int. Cl.
| | |
|---|---|
| A47B 19/00 | (2006.01) |
| A47B 23/00 | (2006.01) |
| A47B 97/04 | (2006.01) |
| A47B 9/02 | (2006.01) |
| A47F 5/08 | (2006.01) |
| F16B 5/07 | (2006.01) |

(52) U.S. Cl.
CPC .............. *A47F 5/0853* (2013.01); *A47F 5/08* (2013.01); *A47F 5/0815* (2013.01); *F16B 5/07* (2013.01)

(58) Field of Classification Search
CPC ....... A47F 5/08; A47F 5/0815; A47F 5/0823; A47F 5/0846; A47F 5/0807
USPC .............. 248/205.4, 220.31, 220.41, 220.42, 248/220.43, 343, 216.1, 216.4, 217.1, 248/217.2, 225.11, 297.21, 447.1, 459; 211/87.01, 54.1, 57.1, 29.1; 52/39; 108/136, 157.13, 157.16, 97, 32; 312/233, 245
See application file for complete search history.

(56) References Cited

U.S. PATENT DOCUMENTS

| | | | | |
|---|---|---|---|---|
| 2,926,877 | A | * | 3/1960 | Levy ...................... 248/220.41 |
| 4,093,168 | A | * | 6/1978 | Buril ...................... 248/220.41 |
| 4,155,461 | A | * | 5/1979 | Young, Jr. ................ 211/106.01 |
| 4,184,725 | A | * | 1/1980 | Spangler ...................... 312/233 |
| 4,369,948 | A | * | 1/1983 | Krauss et al. .............. 248/444.1 |
| D269,155 | S | | 5/1983 | Rose |
| 4,460,145 | A | * | 7/1984 | Ando .......................... 248/447 |
| 4,709,888 | A | * | 12/1987 | Cubit et al. .................... 248/73 |
| 5,149,026 | A | * | 9/1992 | Allen ......................... 248/68.1 |
| 5,379,976 | A | * | 1/1995 | DeGirolamo ............ 248/220.43 |
| 5,397,087 | A | * | 3/1995 | Teece ...................... 248/220.42 |
| 6,152,416 | A | * | 11/2000 | Jacob ........................ 248/441.1 |
| 6,293,056 | B1 | * | 9/2001 | He ................................... 52/39 |
| 6,439,534 | B1 | * | 8/2002 | Hensel ..................... 248/447.1 |
| D506,385 | S | | 6/2005 | Brown |
| 7,100,882 | B2 | * | 9/2006 | Behroozi ...................... 248/317 |
| 7,124,988 | B1 | * | 10/2006 | Duffy et al. ............... 248/284.1 |

(Continued)

*Primary Examiner* — Christopher Garft

(57) ABSTRACT

An overhead slatwall mounting bracket that has an anchoring surface and a biasing surface. The anchoring surface attaches the mounting bracket to a generally horizontal installation surface. The biasing surface may either define or provide one or more elongate slots. The mounting bracket is capable of securely supporting slatwall accessories that include one or more cantilever tabs. Each cantilever tab of the slatwall accessory may be inserted into one of the one or more elongate slots and thereby mount the slatwall accessory to the mounting bracket. The invention provides a means to suspend, mount or temporarily affix the tabbed slatwall accessory from an overhead or horizontal surface by insertion and subsequent rotation of the one or more cantilever tabs extending from the slatwall accessory into the one or more elongate slots.

13 Claims, 5 Drawing Sheets

(56) References Cited

U.S. PATENT DOCUMENTS

| | | | |
|---|---|---|---|
| 7,317,611 B2* | 1/2008 | Dittmer | 361/679.27 |
| D608,183 S | 1/2010 | Meyer et al. | |
| 8,038,111 B2* | 10/2011 | Serizawa et al. | 248/222.51 |
| 8,157,230 B2* | 4/2012 | Krueger et al. | 248/243 |
| 2002/0175259 A1* | 11/2002 | Cress | 248/447.1 |
| 2008/0083514 A1* | 4/2008 | Munson | 160/184 |
| 2011/0267773 A1* | 11/2011 | Macfarlane | 361/679.55 |

* cited by examiner

OVERHEAD MOUNTING BRACKET FOR TABBED ACCESSORIES

CROSS-REFERENCE TO RELATED APPLICATIONS

The present disclosure claims priority to U.S. Provisional Patent Application Ser. No. 61/460,542 entitled "Overhead Mounting Bracket for Tabbed Accessories," filed on Jan. 4, 2011, and U.S. Provisional Patent Application Ser. No. 61/628,136 entitled "Overhead Mounting Bracket for Tabbed Accessories," filed on Oct. 25, 2011. The present disclosure is also related to co-pending U.S. Design patent application Ser. No. 29/374,872, filed on Oct. 19, 2011. The contents of each priority application are hereby incorporated by reference in their entireties.

BACKGROUND

Slatwall is used in a wide range of applications for storing and displaying products, tools, accessories, etc. A few examples of slatwall applications include use in retail display, closet storage, and office furniture (e.g., shelving). Briefly, a slatwall is a wall panel commonly formed of metal, pressed board, or other rigid materials into which a plurality of equidistantly spaced horizontal grooves are defined. The grooves will typically have a cross-section that is either L-shaped or T-shaped. Specially designed accessories, such as brackets, shelves, baskets, etc., are able to be fitted into the grooves defined in the slatwall so that items can be conveniently hung or otherwise supported thereon.

The specially designed accessories are typically mounted into the slatwall through the use of a flat base plate and a cantilever element for fitting into one of the grooves on the slatwall. The cantilever element is generally an L-shaped hook or tab that extends perpendicularly from the base plate and then forms a corner that turns upwards. The base plate is typically designed to rest flat against the surface of the slatwall to support the accessories such as hooks, racks, and shelves by attachment to its outer face. The L-shaped tab generally fits into the slatwall groove such that the vertical portion of the tab may bear against the inner surface of the groove, and the horizontal portion may sit on the lower groove ledge. To install the mounting bracket, the L-shaped tab is generally inserted into one of the grooves with the base plate oriented approximately perpendicular to the slatwall. The corner portion of the tab is then rotated downwards versus the slatwall groove ledge until the tab engages the groove, generally bearing against the inner surface of the groove while the base plate typically rests on the horizontal surface of the slatwall as provided by the groove.

While there are several configurations and variations of vertically-disposed slatwalls and their accompanying accessories, the Inventor is unaware of any slatwall device or apparatus that allows a slatwall accessory to be mounted to an overhead or horizontal surface, such as a ceiling or other horizontal surface. In some applications, however, unrelated to slatwall technology, certain snap clamps and other open-faced mounting devices have been designed to be mounted to an overhead surface and thereby facilitate the support and/or retention of items, such as wire or pipe. However, such open-faced mounting devices fail to provide a mounting device with an orientation or design suitable for the secure support of a slatwall accessory from an overhead or horizontal surface.

SUMMARY OF THE INVENTION

In one or more aspects of the disclosure, an overhead slatwall assembly is disclosed. The assembly may include an overhead slatwall mounting bracket having an anchoring surface and a biasing surface. The anchoring surface may be configured to be attached to a horizontal installation surface and the biasing surface may provide one or more elongate slots. The assembly may further include a slatwall accessory having one or more cantilever tabs. Each cantilever tab may be configured to be inserted into a corresponding one of the one or more elongate slots of the overhead slatwall mounting bracket, thereby mounting the slatwall accessory to the overhead slatwall mounting bracket.

In another aspect of the disclosure, a mounting bracket is disclosed. The mounting bracket may include an anchoring surface and a biasing surface angularly offset from the anchoring surface. The biasing surface may define one or more elongate slots adapted to receive corresponding cantilever tabs extending from an accessory to be supported by the mounting bracket.

In another aspect of the disclosure, another mounting bracket is disclosed. The mounting bracket may include an anchoring surface and a biasing surface. The mounting bracket may further include one or more stabilizing members configured to connect the anchoring surface to the biasing surface. The mounting bracket may also include a snap clamp coupled to the biasing surface and defining one or more elongate slots. The one or more elongate slots may be adapted to receive corresponding cantilever tabs extending from a slatwall accessory to be supported by the mounting bracket.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
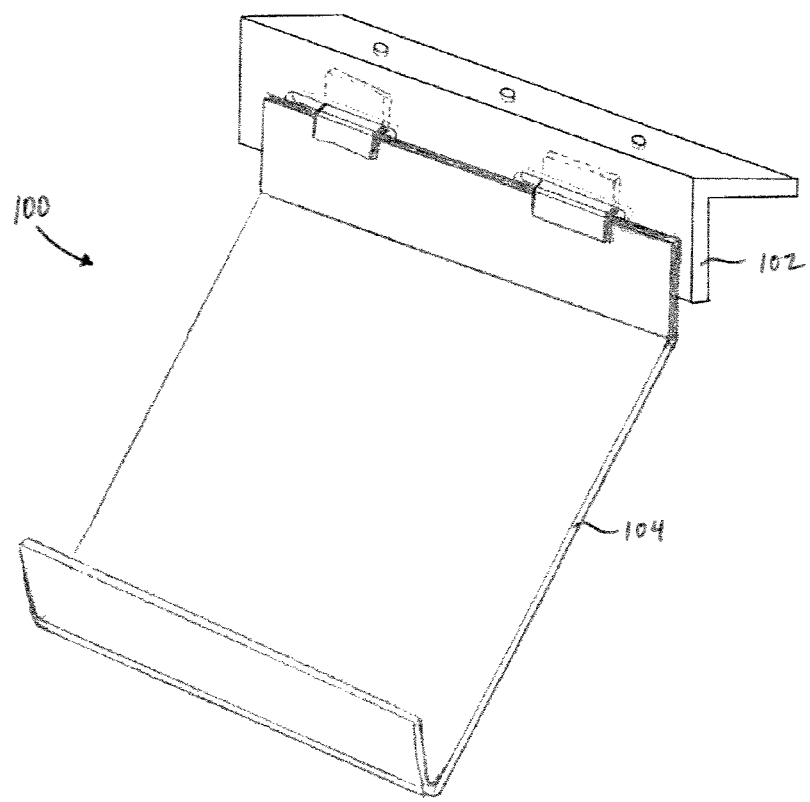
FIG. 1 illustrates an exemplary overhead slatwall assembly, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Referring to FIG. 1, illustrated is an exemplary overhead slatwall assembly 100, according to one or more embodiments. The assembly 100 may include an overhead slatwall mounting bracket 102 and a slatwall accessory 104 that may be mounted on or otherwise mounted to the overhead slatwall mounting bracket 102. In at least one embodiment, however, the overhead slatwall mounting bracket 102 and the slatwall accessory 104 may be integrally formed or manufactured as a single monolithic structure, without departing from the scope of the disclosure. As will be described in greater detail herein, the slatwall mounting bracket 102 may be mounted on a generally horizontal installation surface in order to provide a substantially vertical mount where various configurations of the slatwall accessory 104 may be seated, inserted, affixed, or otherwise retained.

Figure 2A:
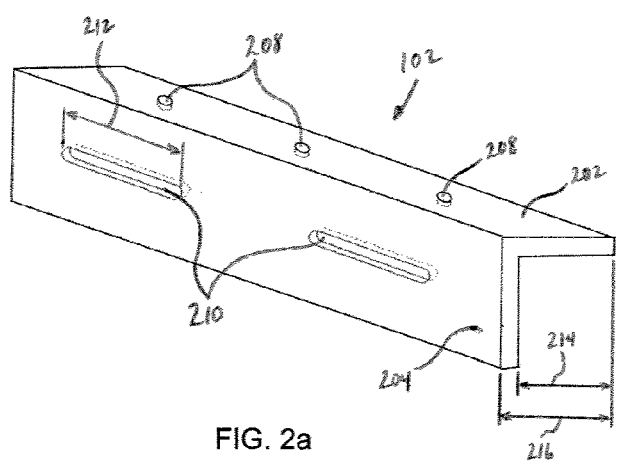
FIGS. 2a and 2b illustrate isometric and side views, respectively, of an exemplary overhead slatwall mounting bracket, according to one or more embodiments disclosed.
Figure 2B:
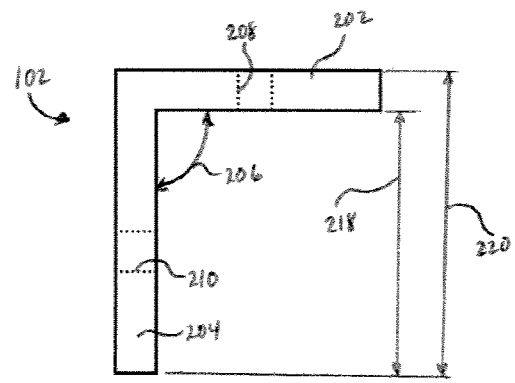

Referring now to FIGS. 2a and 2b, illustrated are isometric and side views, respectively, of the exemplary overhead slatwall mounting bracket 102 shown in FIG. 1, according to one or more embodiments. As illustrated, the overhead slatwall mounting bracket 102 may be a generally L-shaped structure having an anchoring surface 202 and a biasing surface 204. The overhead slatwall mounting bracket 102 may be made from any rigid material including, but not limited to, metals, plastics, woods, ceramics, acrylics, combinations thereof, or any other solid material.

In one or more embodiments, the anchoring and biasing surfaces 202, 204 may be generally orthogonal to each other. In other embodiments, however, the angular disposition 206 (FIG. 2b) between the two surfaces 202, 204 may be greater or less than 90°. For example, the angular disposition 206 between the two surfaces 202, 204 may range from between about 45° and about 135° without departing from the scope of the disclosure. Those skilled in the art, however, will readily recognize that many other variations of the angular disposition 206 may be implemented and still remain within the scope of the disclosure.

The anchoring surface 202 may define one or more apertures 208 extending entirely therethrough. While three apertures 208 are depicted in FIG. 2a, it will be appreciated that more or less than three apertures 208 may be used without departing from the scope of the disclosure. In one or more embodiments, the apertures 208 may be equidistantly spaced from each other along the anchoring surface 208. In other embodiments, however, the apertures 208 may be randomly spaced from each other or laterally offset.

The biasing surface 204 may define one or more elongate slots 210 that extend entirely therethrough. While two elongate slots 210 are depicted in FIG. 2a, it will be appreciated that more or less than two elongate slots 210 may be defined. In one or more embodiments, as depicted, the elongate slots 210 may be generally defined in the shape of an elongate oval. In other embodiments, however, the elongate slots 210 may be defined by other shapes including, but not limited to, any polygonal or circular/arcuate shapes. For example, in at least one embodiment, one or more of the elongate slots 210 may be generally defined in the shape of a rectangle.

Figure 3:
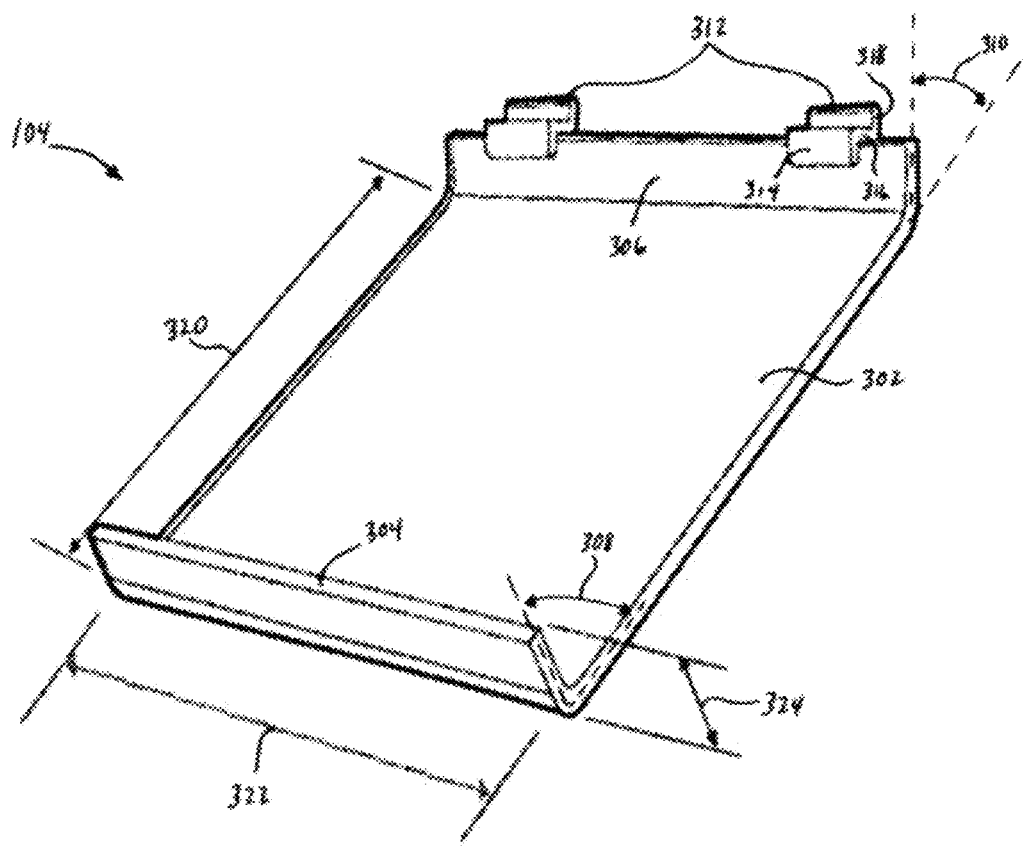
FIG. 3 illustrates and exemplary slatwall accessory, according to one or more embodiments disclosed.

Each elongate slot 210 may be dimensioned with a slot length 212 that extends generally horizontal. As will be described in greater detail below, the elongate slots 210 may be adapted to receive a corresponding cantilever tab 312 (FIG. 3). Consequently, the slot length 212 may generally correspond to the length or dimensions of the cantilever tab 312 and may vary accordingly in order to properly accommodate the tab 312 therein. In one or more embodiments, the slot length 212 may range between 1 inch and 2 inches. In other embodiments, however, the slot length 212 may be less than 1 inch or greater than 2 inches, without departing from the scope of the disclosure, and may depend entirely on the size of the bracket 102 and the application for its use.

As shown in FIG. 2a, the overhead slatwall mounting bracket 102 may have an inner depth 214 and an outer depth 216. In addition, as shown in FIG. 2b, the overhead slatwall mounting bracket 102 may have an inner height 218 and an outer height 220. In one or more embodiments, the inner depth 214 may be about 1 inch and the outer depth 216 may be about 1.25 inches. Moreover, the inner height 218 may be about 1.5 inches and the outer height 220 may be about 1.75 inches. Accordingly, the overhead slatwall mounting bracket 102 may be made of a material that is about 0.25 inches thick. As will be appreciated, however, that the foregoing measurements, and any other measurements or angles disclosed or otherwise described herein, are merely for illustrative purposes and should not be construed to be the only suitable measurements contemplated. Instead, the inner and outer depths 214, 216, the inner and outer heights 218, 220, and any other measurements or angles disclosed or otherwise described herein may vary, depending on the application.

Referring now to FIG. 3, illustrated is an isometric view of the exemplary slatwall accessory 104 shown in FIG. 1, according to one or more embodiments. The slatwall accessory 104 may be made from any rigid material including, but not limited to, metals, plastics, woods, ceramics, acrylics, combinations thereof, or any other solid material. As illustrated, the slatwall accessory 104 may include a mounting surface 302, a retaining surface 304, and an angled surface 306. The retaining surface 304 may extend from the mounting surface 302 in a generally orthogonal direction. In other embodiments, however, the angular disposition 308 between the retaining surface 304 and the mounting surface 302 may be greater or less than 90°. In at least one embodiment, the angular disposition 308 may be directly or indirectly dependent on the angular disposition 206 (FIG. 2b) between the anchoring and biasing surfaces 202, 204 of the overhead slatwall mounting bracket 102 and/or the angular disposition 310 between the angled surface 306 and mounting surface 302 of the slatwall accessory 104.

The angled surface 306 may extend from the mounting surface 302 at an angle 310. The angle 310 may vary depending on the application, for example, depending on the angular disposition desired to mount or otherwise maintain a peripheral device (not shown) on the mounting surface 302. In one or more embodiments, the angle 310 may range from about 0° to about 45°. In other embodiments, however, the angular disposition 310 between the angled surface 306 and the mounting surface 302 may be greater or less than 45°. In at least one embodiment, the angular disposition 310 may be directly or indirectly dependent on the angular disposition 206 (FIG. 2b) between the anchoring and biasing surfaces 202, 204 of the overhead slatwall mounting bracket 102.

The angled surface 306 may also define or otherwise include one or more cantilever tabs 312. While two cantilever tabs 312 are depicted in FIG. 3, it will be appreciated that more or less than two tabs 312 may be used, without departing from the scope of the disclosure. Each cantilever tab 312 may be a generally Z-shaped element attached or otherwise coupled to the angled surface 306 using, for example, mechanical fasteners, adhesives, welding or melding techniques, combinations thereof, or the like. In at least one embodiment, however, the cantilever tabs 312 may be formed integrally with the angled surface 306 such as through an injection molding process or the like. Each cantilever tab 312 may include a seating member 314, a horizontal member 316, and a vertical member 318. The seating member 314 may be configured to bias against or form an integral part of the front face of the angled surface 306 and the horizontal member 316 may be arranged generally normal to the angled surface 306. The vertical member 318 may be disposed generally normal to the horizontal member 316, thereby forming about a 90° angle therebetween.

As briefly noted above, in one or more embodiments, the slatwall accessory 104 may be adapted to receive or otherwise mount a peripheral device (not shown). The peripheral device may include, for example, a tablet computer, such as an IPAD®, a KINDLE®, or other tablet-style computing device, a personal computer, a netbook, or the like. The peripheral device may also include books, other reading materials, decorations, photographs, or any other articles to be displayed. Accordingly, the various dimensions of each feature of the slatwall accessory 104, such as the length 320 and the width 322 of the mounting surface 302, may vary depending on its intended use, and may be particularly designed to accommodate the corresponding sizing of the particular peripheral device. For instance, the retaining surface 304 may have a depth 324 sufficient to hold the peripheral device on the mounting surface 302 such that it does not shift downward and off the mounting surface 302.

In other embodiments, however, the slatwall accessory 104 may not necessarily be configured to mount a peripheral device. Instead, the slatwall accessory 104 may be a sign, or some other device or article of manufacture configured to simply be mounted to the overhead slatwall mounting bracket 102 and extend therefrom. In such embodiments, the retaining surface 304 may or may not be omitted from the slatwall accessory 104 and the design itself of the slatwall accessory 104 may be varied to accommodate its specific purpose. For example, a slatwall accessory 104 configured to display a hat may include a hook-shaped design or element in place of the retaining surface 304, but still including the cantilever tabs 312 necessary for mounting into the elongate slots 210 of the mounting bracket 102.

In one or more embodiments, the length 320 of the mounting surface may range from about 5 inches to about 18 inches, and the width 322 may range from about 5 inches to about 18 inches. Moreover, the depth 324 of the retaining surface 304 may range from about 0.5 inches to about 3 inches. As can be appreciated, however the dimensions of the height 320, the width 322, and the depth 324 may be altered or otherwise varied, depending on the sizing of the peripheral device required to be mounted, without departing from the scope of the disclosure.

Figure 4A:
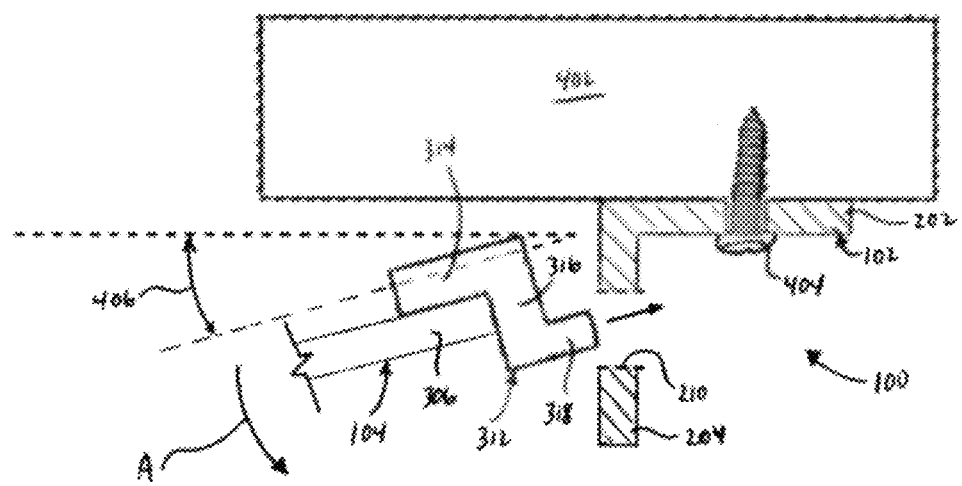
FIGS. 4a and 4b illustrate the installation of the overhead slatwall mounting bracket to support a slatwall accessory, and the mounting of such slatwall accessory, such as is shown in FIG. 1, according to one or more embodiments disclosed.
Figure 4B:
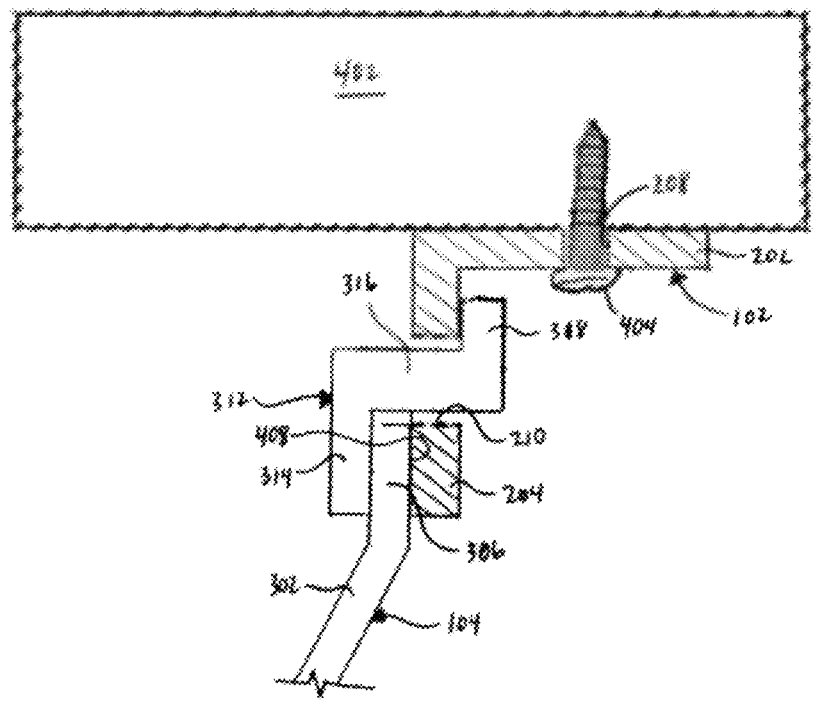

Referring now to FIGS. 4a and 4b, illustrated is an exemplary method of installing or assembling the slatwall assembly 100, according to one or more embodiments. As illustrated, the assembly 100 may be mounted to a generally horizontal installation surface 402. The horizontal installation surface 402 may include, but is not limited to, a ceiling, the underside to kitchen cabinets, the underside to shelving, and the like.

The overhead slatwall mounting bracket 102 may be secured to the horizontal installation surface 402 using various means of attachment. As illustrated, for example, a mechanical fastener 404, such as a screw or a bolt, may be extended through one or more of the apertures 208 defined in the anchoring surface 202 of the overhead slatwall mounting bracket 102 and into the horizontal installation surface 402. In other embodiments, the overhead slatwall mounting bracket 102 may be secured to the horizontal installation surface 402 using adhesives, a VELCRO® interface, snap fasteners, combinations of various installation means, or the like. In yet other embodiments, the overhead slatwall mounting bracket 102 may be secured to the horizontal installation surface 402 using a tongue-and-groove or slot-based installation where the mounting bracket 102 itself fits into a rail or track (not shown) that is mounted to the horizontal installation surface 402. It should be noted that, as used herein, the VELCRO® interface is to be considered a type of adhesive attachment, and not just a hook-and-loop fastener.

After the overhead slatwall mounting bracket 102 has been securely fastened or otherwise coupled to the horizontal installation surface 402, the slatwall accessory 104 may be coupled to, inserted into, and/or affixed to the overhead slatwall mounting bracket 102. To install the slatwall accessory 104, the cantilever tab 312 is angled at an angle of insertion 406 such that the vertical member 318 of the cantilever tab 312 is able to be inserted into a corresponding elongate slot 210 defined in the biasing surface 204 of the overhead slatwall mounting bracket 102. The angle of insertion 406 may range from about 0° to about 90°, depending on the girth of the cantilever tab 312 and/or the height of the elongate opening 210. In any event, the angle of insertion 406 may be configured to be sufficient such that the cantilever tab 312 is able to be inserted generally unobstructed into the elongate slot 210.

Following insertion of the cantilever tab(s) 312, the slatwall accessory 104 is rotated downward, as indicated by arrow A.

Referring to FIG. 4b, the slatwall accessory 104 is rotated downward until a back side 408 of the angled surface 306 bears against the biasing surface 204 of the overhead slatwall mounting bracket 102, and/or the vertical member 318 bears against the inside surface of the biasing surface 204. Further rotational movement in direction A (FIG. 4a) is thereby prohibited, and the cantilever tab(s) 312 is effectively coupled to the overhead slatwall mounting bracket 102. In this position, the horizontal member 316 may bear against the inside surface of the elongate slot 210, and the angled surface 306 is disposed generally vertical and may bear against the outside surface of biasing surface 204, but the mounting surface 302 may be angled corresponding to the angle 310 referenced above in FIG. 3. As a result, the user may retain any peripheral device retained on the mounting surface 302 at this angular configuration for ease of viewing or use. Removal of the slatwall accessory 104 is accomplished by reversing this process.

Figure 5:
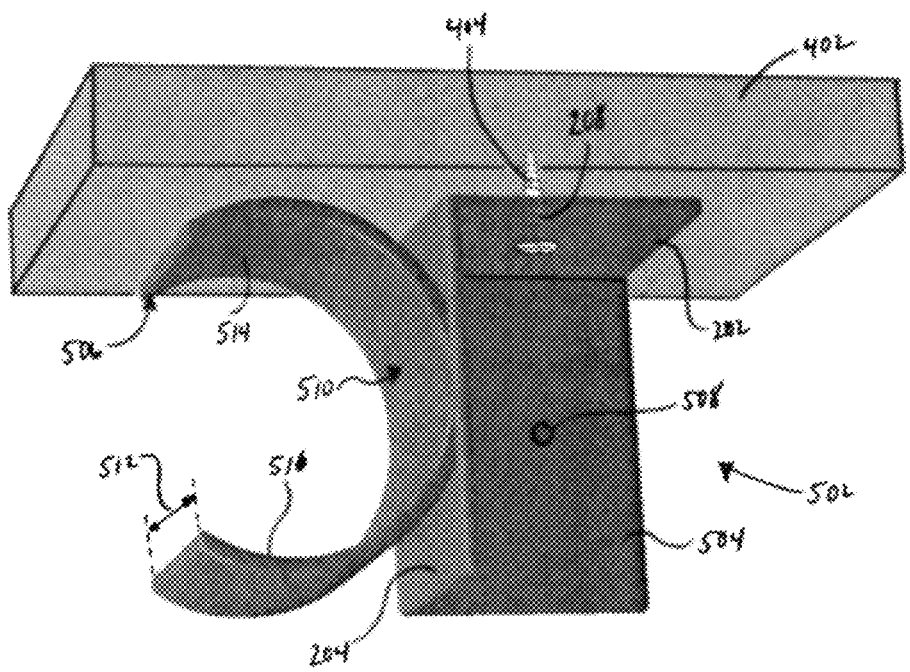
FIG. 5 illustrates another exemplary overhead slatwall mounting bracket, according to one or more embodiments disclosed.

Referring now to FIG. 5, illustrated is another exemplary overhead slatwall mounting bracket 502, according to one or more embodiments. The overhead slatwall mounting bracket 502 is similar to the overhead slatwall mounting bracket 102 described above with reference to FIGS. 1, 2a, and 2b. Accordingly, the overhead slatwall mounting bracket 502 may be best understood with reference to FIGS. 1, 2a, and 2b, where like numerals indicate like components that will not be described again in detail. As with the overhead slatwall mounting bracket 102, the overhead slatwall mounting bracket 502 may be attached or otherwise coupled to a generally horizontal installation surface 402. One or more mechanical fasteners 404, such as a screw or a bolt, may be extended through corresponding apertures 208 defined in the anchoring surface 202 of the overhead slatwall mounting bracket 502 and into the horizontal installation surface 402. In other embodiments, the overhead slatwall mounting bracket 502 may be secured to the horizontal installation surface 402 using adhesives, a VELCRO® interface, snap fasteners, combinations of various known installation means, or the like.

The overhead slatwall mounting bracket 502 may further include a stabilizing member 504 and a snap clamp 506. The stabilizing member 504 may be coupled to both the anchoring surface 202 and the biasing surface 204. In one or more embodiments, the stabilizing member 504 may be configured to stabilize or otherwise support the biasing surface 204 against lateral movement during use. The stabilizing member 504 may define one or more apertures 508 (only one aperture 508 shown) therein. The apertures 508 may be configured to receive corresponding mechanical fasteners (e.g., mechanical fasteners 404) in order to secure the overhead slatwall mounting bracket 502 to a generally vertical installation surface (not shown).

In one embodiment, the overhead slatwall mounting bracket 502 may be secured solely with the stabilizing member 504 against a generally vertical installation surface. In other embodiments, the overhead slatwall mounting bracket 502 may be secured solely with the anchoring surface 202 against the horizontal installation surface 402. In yet other embodiments, the overhead slatwall mounting bracket 502 may be secured using a combination of both the stabilizing member 504 and the anchoring surface 202.

The snap clamp 506 may be coupled to the biasing surface 204 and define an elongate slot 510. In one or more embodiments, the snap clamp 506 may be a length of pipe or tubular with strategically-excised portions that provide access into the interior of the pipe and thereby define the elongate slot 510 or corresponding numbers of elongate slots 510. In one or more embodiments, the snap clamp 506 is integrally formed with the biasing surface 204, such as through an injection molding process or the like. Similar to the elongate slot 210 described above with reference to FIGS. 2a and 2b, the elongate slot 510 shown in FIG. 5 may be dimensioned with a slot length 512 that extends generally horizontal. The snap clamp 506 may further define an upper cavity wall 514 and a bottom cavity wall 516. The elongate slot 510 may be adapted to receive a corresponding cantilever tab 312 (FIG. 3) in order to properly mount the slatwall accessory 104 to the overhead slatwall mounting bracket 502. Consequently, the slot length 512 may generally correspond to the length or dimensions of the cantilever tab 312 and may vary accordingly in order to properly accommodate the tab 312.

Figure 6:
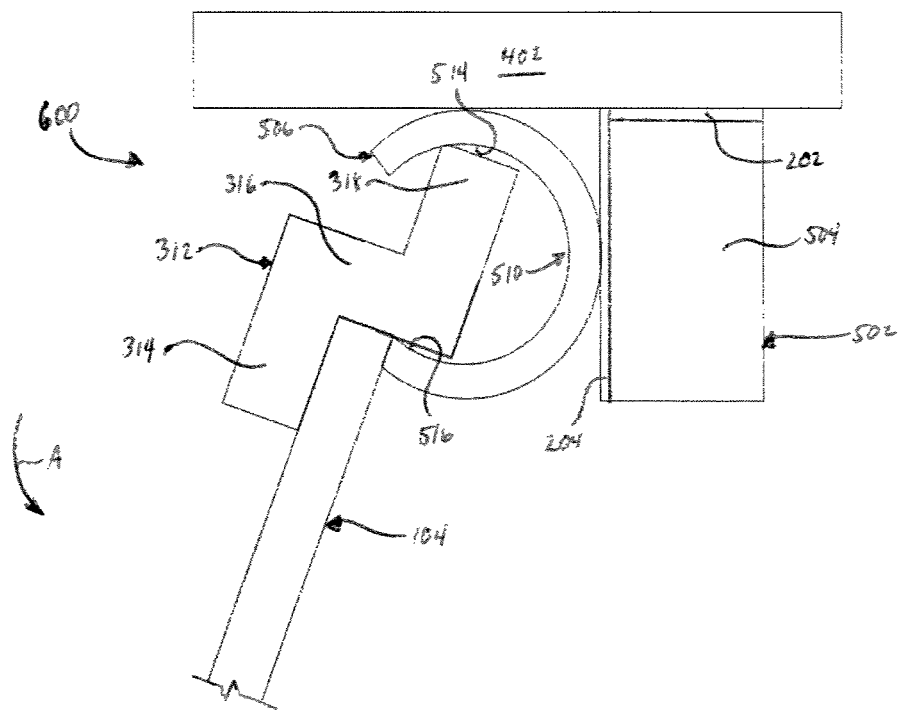
FIG. 6 illustrates another exemplary overhead slatwall assembly, according to one or more embodiments disclosed.

Referring to FIG. 6, illustrated is a side view of an exemplary overhead slatwall assembly 600, according to one or more embodiments. The assembly 600 may include the overhead slatwall mounting bracket 502 and the slatwall accessory 104, as generally described above. As illustrated in FIG. 6, the slatwall accessory 104 is mounted in the overhead slatwall mounting bracket 502 for use. In order to properly mount the slatwall accessory 104, the cantilever tab 312 is angled such that its vertical member 318 is able to be inserted into the elongate slot 510 defined in the snap clamp 506 of the overhead slatwall mounting bracket 502. The proper angle of insertion may be substantially similar to the angle of insertion 406 described above with reference to FIG. 4a, and therefore will not be described again.

Following insertion of the cantilever tab(s) 312, the slatwall accessory 104 is rotated downward, as indicated by arrow A, until the back side of the slatwall accessory 104 (or the angled surface 306) bears against the snap clamp 506 and the vertical member 318 bears against the upper cavity wall 514. As the vertical member 318 bears against the upper cavity wall 514, the horizontal member 316 may bear against the bottom cavity wall 516, and the back side of accessory 104 may bear against the bottom entrance to the snap clamp 506, thereby wedging the cantilever tab 312 in place. Further rotational movement in direction A is thereby prohibited, and the cantilever tab 312 is effectively coupled to the overhead slatwall mounting bracket 502. Removal of the slatwall accessory 104 is accomplished by reversing this process.

Figure 7:
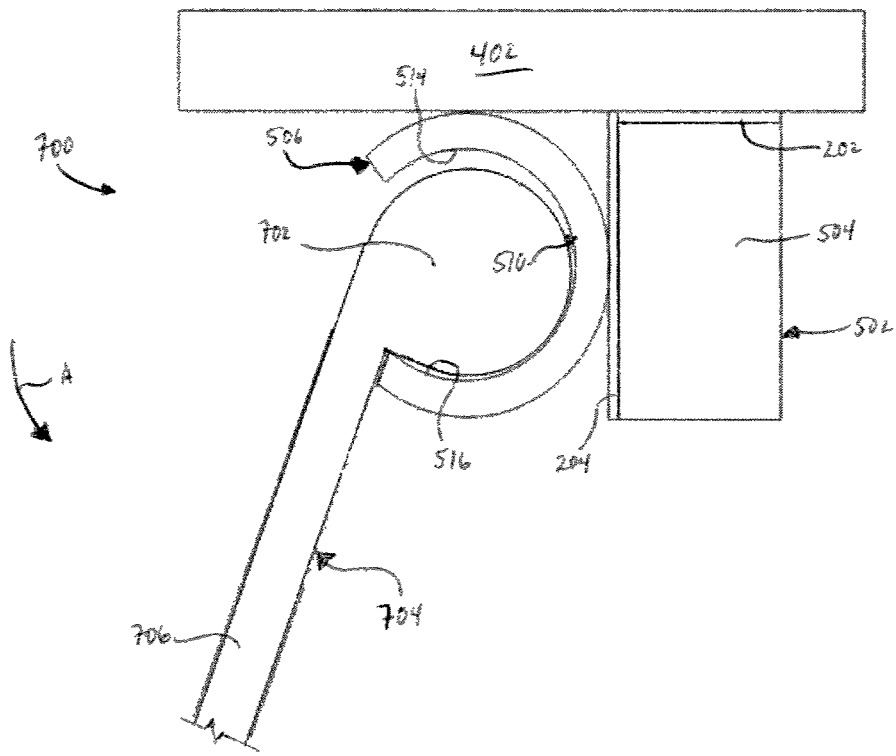
FIG. 7 illustrates another exemplary overhead slatwall assembly, according to one or more embodiments disclosed.

Referring now to FIG. 7, illustrated is a side view of another exemplary overhead slatwall assembly 700, according to one or more embodiments. The assembly 700 may include the overhead slatwall mounting bracket 502 and one or more rounded cantilever tabs 702 that can be mounted in the corresponding elongate slots 510. The slatwall accessory 704 may include a generally planar mounting surface 706 that extends from the one or more rounded cantilever tabs 702. Each rounded cantilever tab 702 may be attached or otherwise coupled to the planar mounting surface 706 using, for example, mechanical fasteners, adhesives, welding or melding techniques, combinations thereof, or the like. In at least one embodiment, however, the rounded cantilever tabs 702 may be formed integrally with the planar mounting surface 706 such as through an injection molding process or the like. Except for the rounded cantilever tabs 702 replacing the cantilever tabs 312, the slatwall accessory 704 may be similar to the slatwall accessory 104 described above with reference to FIG. 3. For example, the slatwall accessory 704 may also include the mounting surface 302 and the retaining surface 304. In addition, the design of the slatwall accessory 704 may vary to accommodate various purposes as previously discussed for the slatwall accessory 104 of FIG. 3.

In order to mount the slatwall accessory 704 into the snap clamp 506, the rounded cantilever tabs 702 may be inserted into the elongate slot 510 by sliding the tabs 702 longitudinally into the slot 510 from one of its lateral ends. In other embodiments, however, the rounded cantilever tabs 702 may be snapped into the snap clamp 506 by forcing the rounded cantilever tabs 702 through the open mouth at the front of the elongate slot 510. Once the rounded head 702 is seated within the elongate slot 510, the slatwall accessory 704 may be rotated downward, as indicated by arrow A, until the back side of the mounting surface 706 bears against the snap clamp 506 and thereby prevents further rotational movement.

Figure 8:
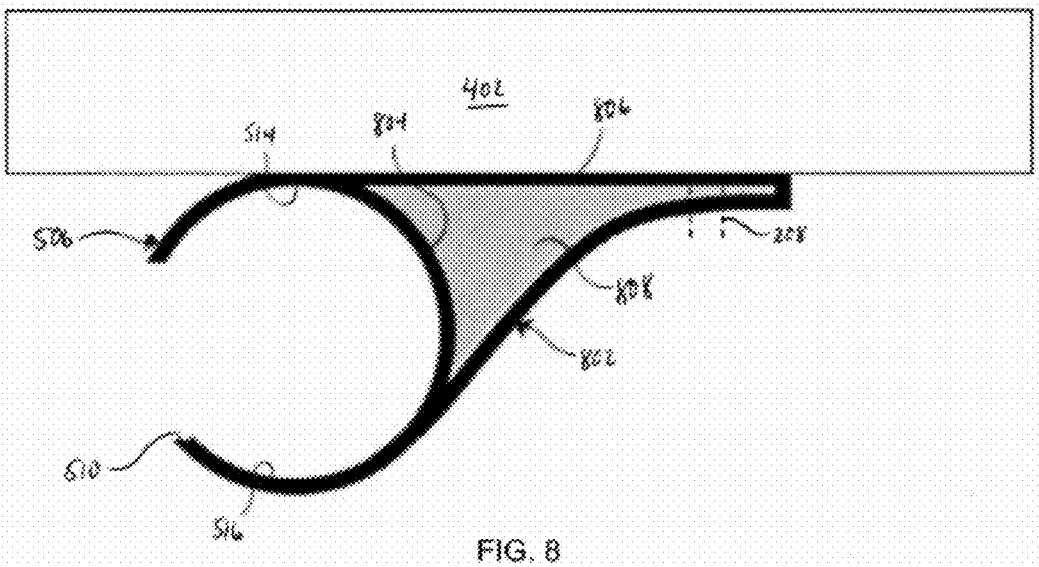
FIG. 8 illustrates another exemplary overhead slatwall mounting bracket, according to one or more embodiments disclosed.
Figure 9:
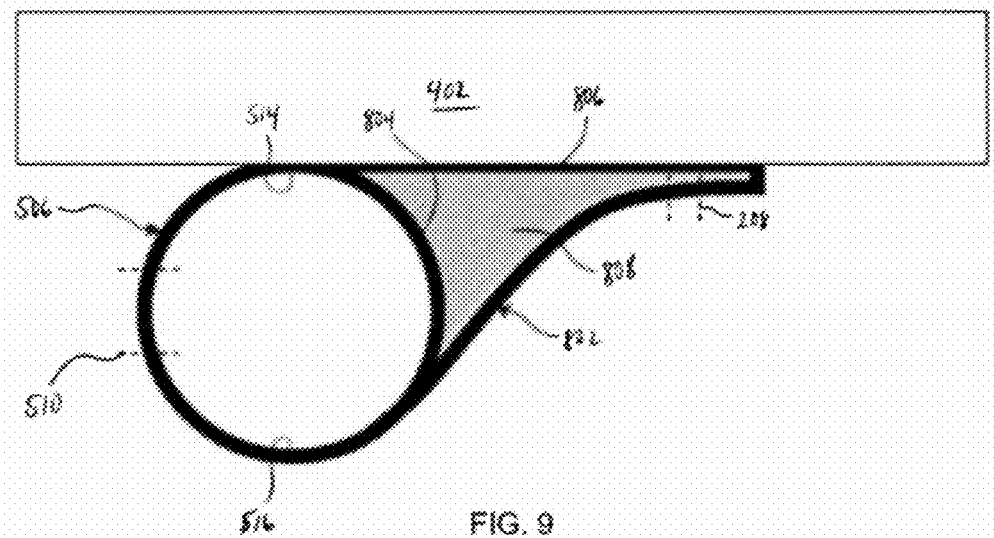
FIG. 9 illustrates another exemplary overhead slatwall mounting bracket, according to one or more embodiments disclosed.

Referring now to FIGS. 8 and 9, illustrated is another exemplary overhead slatwall mounting bracket 802, according to one or more embodiments. The overhead slatwall mounting bracket 802 is similar to the overhead slatwall mounting bracket 502 described above with reference to FIGS. 5-7. Accordingly, the overhead slatwall mounting bracket 802 may be best understood with reference to FIGS. 5-7, where like numerals indicate like components that will not be described again. For example, the overhead slatwall mounting bracket 802 may include the snap clamp 506 that defines one or more elongate slots 510 and has the upper and lower cavity walls 514, 516. As with prior embodiments, the snap clamp 506 may be a length of pipe or tubular and the elongate slots 510 may be strategically-excised portions that provide access into the interior of the snap clamp 506.

Also similar to the overhead slatwall mounting bracket 502, the overhead slatwall mounting bracket 802 may further include a biasing surface 804, an anchoring surface 806, and a stabilizing member 808. The snap clamp 506 may be an arcuate member coupled to the arcuate biasing surface 804 using various attachment means including, but not limited to, mechanical fasteners, adhesives, welding, brazing, combinations thereof, or the like. In other embodiments, the snap clamp 506 is integrally formed with the arcuate biasing surface 804, such as through an injection molding process or the like.

The anchoring surface 806 may be coupled to the biasing surface 804 at one end and extend substantially horizontal therefrom. As with prior embodiments, the anchoring surface 806 may define one or more apertures 208 therein for the receipt of corresponding mechanical fasteners (not shown) in order to secure the overhead slatwall mounting bracket 802 to the horizontal installation surface 402. In other embodiments, the overhead slatwall mounting bracket 802 may be secured to the horizontal installation surface 402 using adhesives, a VELCRO® interface, snap fasteners, combinations of various installation means, or the like. In yet other embodiments, the overhead slatwall mounting bracket 802 may be secured to the horizontal installation surface 402 using a tongue-and-groove or slot-based installation where the mounting bracket 102 itself fits into a rail or track (not shown) that is mounted to the horizontal installation surface 402.

The stabilizing member 808 may be coupled to both the biasing and anchoring surfaces 804, 806 using various attachment means including, but not limited to, mechanical fasteners, adhesives, welding, brazing, combinations thereof, or the like. In other embodiments, the stabilizing member 808 is integrally formed with both the biasing and anchoring surfaces 804, 806, such as through an injection molding process or the like, and thereby generating a monolithic structure. In use, the stabilizing member 808 may be configured to stabilize or otherwise support the biasing surface 804 against lateral movement during use. Although not shown, the stabilizing member 504 may define one or more apertures configured to receive corresponding mechanical fasteners in order to secure the overhead slatwall mounting bracket 802 to a generally vertical installation surface (not shown). While only one is shown in FIGS. 8 and 9, it will be appreciated that more than one stabilizing member 808 may be used in the overhead slatwall mounting bracket 802. For example, the multiple stabilizing members 808 may be spaced from each other along an axial length of the snap clamp 506 in order to further stabilize the overhead slatwall mounting bracket 802 along is length.

The overhead slatwall mounting bracket 802 may be configured to receive and mount any of the slatwall accessories 104, 704 described herein, and/or variations thereof. For example, the elongate slot 510 in FIGS. 8 and 9 may be adapted to receive the cantilever tab 312 as shown in FIG. 3, and the elongate slot 510 in FIG. 8 may be adapted to receive the rounded cantilever tab 702 as shown in FIG. 7.

As will be appreciated by those skilled in the art, there is no limitation to the shape, size or dimension of the overhead slatwall mounting brackets 102, 502, 802 described herein for the support of any objects with available mounting tabs or analogous mounting devices (i.e., the rounded cantilever tabs 702), such as may be found on various slatwall accessories. Indeed, the brackets 102, 502, 802 may be constructed of any material or combination of materials and in any shape, size and dimension as appropriate to accommodate the particular tabbed slatwall accessory (e.g., slatwall accessory 104) that it will support. Moreover, the disclosure is not limited to the mounting of a single slatwall accessory to an overhead or horizontal surface as described herein, but is also envisioned to support multiple slatwall accessories by the insertion of one or more mounting tabs or analogous mounting devices extending from any number of slatwall accessories into one or more slots or cavities. Further, the invention is specifically not limited to the mounting of slatwall accessories, but can also be used for the mounting of other tabbed objects from an overhead or horizontal surface.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. An overhead slatwall assembly, comprising:
   an overhead slatwall mounting bracket having an anchoring surface and a biasing surface disposed orthogonal to the anchoring surface, the anchoring surface being attached to a bottom of a horizontal installation surface and the biasing surface providing one or more elongate slots, wherein the horizontal installation surface includes an underside of a cabinet or shelf in a kitchen; and
   a slatwall accessory comprising:
      one or more Z-shaped cantilever tabs, each Z-shaped cantilever tab being inserted into a corresponding one of the one or more elongate slots of the overhead slatwall mounting bracket, thereby mounting the slatwall accessory to the overhead slatwall mounting bracket;
      a planar mounting surface extending between a first end and a second end and sized to receive a peripheral device selected from the group consisting of a tablet computer, a personal computer, a netbook, and a book;

an angled surface extending from the first end at a first angle and attached to said one or more Z-shaped cantilever tabs; and a retaining surface extending from the second end at a second angle for holding the peripheral device on the planar mounting surface.

2. The assembly of claim 1, wherein the anchoring surface defines one or more apertures therein, the one or more apertures being configured to receive corresponding mechanical fasteners for attaching the overhead slatwall mounting bracket to the bottom of the horizontal installation surface.

3. The assembly of claim 1, wherein the overhead slatwall mounting bracket is attached to the horizontal installation surface by adhesively attaching the anchoring surface to the bottom of the horizontal installation surface.

4. The assembly of claim 1, wherein the one or more elongate slots comprise at least two elongate slots horizontally-spaced from each other on the biasing surface.

5. The assembly of claim 1, wherein each Z-shaped cantilever tab comprises a seating member coupled to or forming part of the angled surface, a horizontal member arranged generally normal to the angled surface, and a vertical member disposed generally normal to the horizontal member.

6. The assembly of claim 1, wherein the one or more Z-shaped cantilever tabs are coupled to the angled surface via at least one of a mechanical fastener, an adhesive, a weld, by melding, or any combination thereof.

7. The assembly of claim 1, wherein the one or more Z-shaped cantilever tabs are formed integrally with the angled surface and extend therefrom.

8. The assembly of claim 5, wherein, when the slatwall accessory is mounted to the overhead slatwall mounting bracket, the angled surface bears against the biasing surface and the vertical member bears against an inside surface of the biasing surface.

9. The assembly of claim 5, wherein, when the slatwall accessory is mounted to the overhead slatwall mounting bracket, the angled surface bears against the biasing surface and the horizontal member bears against an inside surface of the elongate slot.

10. The assembly of claim 5, wherein, when the slatwall accessory is mounted to the overhead slatwall mounting bracket, the vertical member bears against an inside surface of the biasing surface and the horizontal member bears against an inside surface of the elongate slot.

11. The assembly of claim 1, wherein the overhead slatwall mounting bracket and the slatwall accessory are made of a plastic or an acrylic.

12. The assembly of claim 1, wherein a width of the mounting surface is between five inches and eighteen inches to accommodate the peripheral device.

13. The assembly of claim 1, wherein a length of the mounting surface is between five inches and eighteen inches to accommodate the peripheral device.

* * * * *